United States Patent [19]

Fruit et al.

[11] Patent Number: 5,454,009
[45] Date of Patent: Sep. 26, 1995

[54] METHOD AND APPARATUS FOR PROVIDING ENERGY DISPERSAL USING FREQUENCY DIVERSITY IN A SATELLITE COMMUNICATIONS SYSTEM

[75] Inventors: Larry J. Fruit, Seminole; John A. Schachte, Indialantic; Charles A. Herbst, Palm Bay; James A. Wilkerson, Jr., Palm Harbor, all of Fla.

[73] Assignee: Scientific-Atlanta, Inc., Norcross, Ga.

[21] Appl. No.: 181,318

[22] Filed: Jan. 13, 1994

[51] Int. Cl.⁶ ............................................ H04B 1/713
[52] U.S. Cl. .................................................. 375/202
[58] Field of Search .............................. 375/1; 380/34, 380/46, 49

[56] References Cited

U.S. PATENT DOCUMENTS

| | | |
|---|---|---|
| Re. 32,905 | 4/1989 | Baran ........................................... 375/1 |
| B1 Re.32,905 | 11/1992 | Baran . |
| 3,816,657 | 6/1974 | Fletcher et al. . |
| 4,344,178 | 8/1982 | Waters . |
| 4,375,099 | 2/1983 | Waters et al. . |
| 4,389,722 | 6/1983 | Hofmeister . |
| 4,423,390 | 12/1983 | Waters . |
| 4,455,651 | 6/1984 | Baran ........................................... 375/1 |
| 4,587,661 | 5/1986 | Schiff ........................................... 375/1 |
| 4,653,053 | 3/1987 | Pelchat et al. . |
| 4,707,839 | 11/1987 | Andren et al. . |
| 4,748,622 | 5/1988 | Muratani et al. . |
| 4,765,753 | 8/1988 | Schmidt . |
| 4,821,120 | 4/1989 | Tomlinson . |
| 4,901,368 | 2/1990 | Arnold et al. . |
| 4,907,181 | 3/1990 | Hedtke et al. . |
| 4,932,070 | 6/1990 | Waters et al. . |
| 4,943,976 | 7/1990 | Ishigaki . |
| 4,953,178 | 8/1990 | Ishigaki . |
| 4,977,578 | 12/1990 | Ishigaki et al. . |
| 5,020,075 | 5/1991 | Tachika . |
| 5,144,640 | 9/1992 | Yamamoto . |
| 5,151,919 | 9/1992 | Dent . |
| 5,157,686 | 10/1992 | Omura et al. ............................... 375/1 |
| 5,170,411 | 12/1992 | Ishigaki . |
| 5,177,765 | 1/1993 | Holland et al. . |
| 5,177,766 | 1/1993 | Holland et al. . |
| 5,189,683 | 2/1993 | Cowart ........................................ 375/1 |
| 5,204,876 | 4/1993 | Bruckert et al. . |
| 5,210,770 | 5/1993 | Rice ............................................. 375/1 |

*Primary Examiner*—David C. Cain
*Attorney, Agent, or Firm*—Banner & Allegretti, Ltd.

[57] ABSTRACT

A satellite communications system for dispersing energy over a wide bandwidth includes a transmitter, a communication link, and a receiver. The transmitter takes a digital data signal and modulates that signal at a prescribed carrier frequency. The modulated digital data signal is then spread over M adjacent digital channels ($M \geq 2$ and being an integer multiple of 2), each channel containing the same information, to disperse the energy over a wide frequency range. The spectral bandwidth of the adjacent digital channels is chosen with compressed spacing to conserve bandwidth. Next, the spread modulated data signal is transmitted via the communication link to the receiver. In particular, a waveform generator at the transmitter generates a phase-aligned multichannel frequency diversity waveform according to a data clock at a predetermined phase relationship to the digital data. At the receiver, the spread modulated data signal received is mixed with a despreading waveform generated in a similar manner to the waveform spectrum generated at the transmitter to recover the modulated data signal. The despreading waveform is generated according to a symbol clock signal recovered from the received modulated data signal. A demodulator recovers the original digital data from the modulated data signal. To achieve higher spreading factors, multichannel frequency diversity may be utilized with known spread spectrum techniques to achieve high data recovery rates during adverse weather (fading) conditions at high radio frequencies in the microwave and higher regions of the radio spectrum.

77 Claims, 9 Drawing Sheets

BASEBAND MODULATED SPECTRUM

MULTICHANNEL FREQUENCY DIVERSITY SPECTRUM (m=4)

MIXING TONES (m=4)

FREQUENCY / SYMBOL RATE
MINIMUM SPACED MULTICHANNEL FREQUENCY
DIVERSITY SPECTRUM (m=4)

FREQUENCY / SYMBOL RATE
PHASE ALIGNED MULTICHANNEL FREQUENCY
DIVERSITY SPECTRUM (m=4, φ=45°)

SYMBOL CLOCK TRANSITION $(2\pi * f_1 t + \pi/4)$

SYMBOL CLOCK TRANSITION $(2\pi * 3f_1 t + 3\pi/4)$

SYMBOL CLOCK TRANSITION

SYMBOL n | SYMBOL n+1 | SYMBOL n+2 | SYMBOL n+3

SUM OF TWO SINE WAVES

METHOD AND APPARATUS FOR PROVIDING ENERGY DISPERSAL USING FREQUENCY DIVERSITY IN A SATELLITE COMMUNICATIONS SYSTEM

FIELD OF THE INVENTION

The present invention relates to the field of satellite communications systems for establishing communications from a hub station to a remote station and from a remote station to a hub station via geosynchronous satellites in microwave frequency bands such as the C and Ku frequency bands, and more particularly, to a method and apparatus incorporating a technique, referred to herein as multichannel frequency diversity, to provide energy dispersal in a satellite communications system to improve signal to noise ratio at a receiver despite fading conditions and in conformity with Federal Communication Commission (FCC) Effective Isotropic Radiated Power (EIRP) requirements.

BACKGROUND OF THE INVENTION

A satellite communication system for communications between a central hub station and remote earth stations equipped with so-called very small aperture terminals (VSATs) includes a hub station including an uplink, at least one geosynchronous communication satellite having a predetermined earth "footprint", and an unlimited number of VSATs for receiving transmissions from an associated communication satellite. Until the early 1980's most satellite broadcasters used C-band frequencies. Now communication satellites that broadcast radio, television, computer, and other data messages in the Ku-band frequency range are commonplace. The 10.95 to 14.50 GHz band (Ku-band) of the electromagnetic spectrum has been allocated solely for satellite transmissions. The higher frequency Ka-band (17.7 to 21.2 GHz) is being eyed by potential users for future satellite communications. One such system presently in operation using the Ku-band frequency range is the Scientific-Atlanta SkylinX.25 VSAT network which consists of a master earth station or hub, and geographically distributed VSATs which communicate therewith.

The FCC requires that: (1) the satellite EIRP not exceed 6 dBW per 4 kilohertz of bandwidth on the downlink; and that (2) the power spectral density into the feed of an earth station antenna not exceed −14 dBW per 4 kilohertz of bandwidth on the uplink. For a given modulation technique, these standards place an upper limit on the amount of fade caused by weather conditions, including rain, which can be tolerated on both the uplink and downlink.

As microwave communication frequencies increase, weather conditions become more likely to adversely affect reception and signal-to-noise ratio. Multipath fading results when components of a direct signal and reflections interact to reduce or increase the net received signal amplitude. The depth of fade can fluctuate widely and may cause a complete failure of transmission in one or more channels for short periods of time. As raindrop size becomes an appreciable fraction of the transmitted wavelength, variations in attenuation due to absorption or scattering increases. Therefore, it is desirable at microwave frequency levels to provide a means to insure a good signal to noise ratio at the receiver and minimize the effects of fading.

To provide a more economical VSAT system, the overall cost of the antenna used with the remote stations can be reduced in the areas of production, installation and handling. This can be accomplished by using smaller antennas which can be shipped by less expensive means and installed/setup by fewer people in a shorter time. With a smaller antenna at the remote site, the received signal-to-noise ratio (SNR) on the outbound link from the HUB station to the remote station is now diminished to an unacceptably low level. Furthermore, the smaller antenna cannot provide an adequate amount of uplink output power on the return link from the remote station to the HUB station. To increase the SNR at the remote station, the downlink power from the satellite must be increased. This can be done by increasing the uplink power from the HUB and, at the same time, reducing the energy density to remain within the FCC energy density limit at the satellite output. Energy dispersal can be used to spread the signal energy over a wider bandwidth and thereby maintain the energy density to within the FCC limit. Similarly, energy dispersal can be used on the return link to increase the power into the antenna feed while maintaining the FCC feed energy density limit.

Spreading techniques known in the art such as frequency hopping and direct sequence spreading facilitate energy dispersal. Many communications systems employ spread spectrum techniques for a variety of applications. According to conventional spread spectrum systems, message information is time and/or frequency encoded with a pseudo-noise (PN) sequence to provide a transmission signal spread over a wide bandwidth or frequency spectrum relative to the message or information bandwidth. The transmission signal passes through a selected wide band communication channel to a receiver which acquires and tracks the transmission signal timing and thereafter recovers the encoded message.

Spread spectrum systems typically incorporate a pseudo-random noise (PN) generator at the transmitter for generating, for example, a phase modulated spread spectrum signal. The receiver employs a corresponding PN generator synchronized to the transmitter PN generator for coherent detection of the message signal. The PN generators at the transmitter and receiver provide a low-level transmission signal which can be correlated with an internally generated receiver pseudo-random noise signal to improve signal to noise ratio and to increase system reliability. Once an incoming spread spectrum signal has been detected and identified, various techniques may be employed for recovering the message data. One such system is described by U.S. Pat. No. 4,977,578 to Ishigaki et al. U.S. Pat. No. B1 Re 32,905 to Baran, a reexamination of the reissue of U.S. Pat. No. 4,455,651, discloses another exemplary system, particularly directed to spread spectrum communication in a satellite communications system.

In microwave ground communications, frequency diversity over the same communications path is used where identical information is transmitted via an 11 GHz band link and a 6 GHz band link. With the same information transmitted over independent fading channels, the information quality is improved. However, in such an arrangement, dual facilities (transmitters, waveguide runs, antennas, and receivers) are required resulting in increased equipment expense.

There remains a need in the art to provide high weather availability of the communication links and moreover, to permit the utilization of smaller sized antennas of aperture sizes of around one meter. Further, the FCC limits imposed on satellite communications make it desirable to more efficiently utilize the bandwidth of the transmitted signal energy.

SUMMARY OF THE INVENTION

The present invention provides a method which realizes improved communication quality using small antennas with channel fading while remaining within the limitations set forth by the FCC. Using an energy dispersal technique generically referred to herein, as multichannel frequency diversity, each channel from a set of M channels contains the same modulated data information and is coherently recombined and demodulated in a receiver to achieve a processing gain of M. Moreover, the set of M channels are transmitted in a manner to conserve satellite bandwidth in the band of interest, be it C-band, Ku-band, or Ka-band.

One advantage associated with the present invention is that the receiver does not have to perform a time/frequency search as in conventional spread spectrum techniques. Rather, despreading is done at the basic symbol rate. Once the symbol rate has been determined, a despreading waveform generator provides the number of reference signals needed for demodulation.

In spread spectrum systems, despreading of the spread spectrum signal in the receiver is difficult. PN spreading typically works at high spreading ratios where cross-correlation pulses are very narrow in time and it is difficult to synchronize the despreading process accurately. However, the present invention has spreading factors on the order of 4, 8, or 16 where a symbol reference signal is determined using a narrow band phase-lock loop. One embodiment of the present invention employs a divide by N plus or minus one divider and a digital loop, to allow the system to determine symbol clock timing with a reference frequency of 10 MHz for example. Since the symbol timing loop operates independent of the carrier Costas phase-lock loop, it can operate with a very narrow loop bandwidth.

A communications system for transmitting and receiving digital data at a predetermined data rate according to the present invention disperses energy without many of the drawbacks associated with existing spread spectrum systems. A transmitting portion of such a system includes a means for generating M (M being an integer multiple of two) adjacent digital channels where each channel has a waveform having a mathematical relationship to each waveform of each other channel and a precise phase relationship to the symbol transitions, means for modulating the digital data by a carrier frequency, means for forming a composite signal by impressing the modulated digital data onto each carrier wave of each channel, and means for transmitting the composite signal. The transmitting portion may include means for encoding the digital data with forward error correction information.

The receiving portion of the system includes means for receiving the composite signal, clock recovery means for recovering a symbol clock based on the predetermined symbol rate of the received composite signal, second channel generating means, responsive to the symbol clock, for generating carrier waves corresponding to each channel generated by said first channel generating means, each carrier wave having the mathematical relationship to each other waveform and the phase relationship prescribed by the first channel generating means, means for mixing the carrier waves generated by said second channel generating means with the composite signal to recover the modulated digital data, and demodulating means for demodulating the digital data. The receiving portion may include error decoding means for detecting and correcting errors in the demodulated digital data based on forward error correction information. A satellite communication link couples the receiving portion and the transmitting portion of the system.

According to one embodiment of the invention, the mathematical relationship between each generated waveform includes an odd integer multiplication factor. For example, two waves may be used to generate four carrier tones. A first wave may be represented by $\sin(2\pi*f_1 t + \phi)$ and a second wave may be represented by $\sin(2\pi*3f_1 t + 3\phi)$ wherein $f_1$ is a function of the predetermined symbol rate, $\phi$ is a function of the phase relationship between the tones and the symbol transitions, and t is the time period. The mathematical relationship to derive a four channel system may further include a sum of the first waveform and the second waveform. The phase relationship can range from 0° to 90°. If M carrier waves are required where M is greater than four, then, a third waveform may be generated at $\sin(2\pi*5f_1 t + 5\pi)$ and so on in order to generate additional carriers.

In one preferred embodiment of the invention, four adjacent digital channels can be generated. Further, the channel generating means compresses the spectral bandwidth of the four channels to be equal to approximately a spectral bandwidth of three times the bandwidth of the original unspread signal. Generically, the generating means compresses the spectral bandwidth of the four adjacent digital channels by approximately 25%. In the four channel embodiment, energy dispersal has been maximized using a phase relationship $\phi$ of approximately 45°.

A method of dispersing energy over a wide bandwidth when communicating digital data having a predetermined data rate according to the present invention includes the steps of modulating the digital data by a predetermined carrier frequency, generating a plurality of M adjacent channels, M being an integer multiple of two, wherein each channel has a waveform mathematically related to each waveform of each other channel and each channel has a predetermined phase relationship to the digital data having the predetermined symbol rate, dispersing the modulated digital data on the M channels, wherein each channel contains the same modulated digital data, coherently recombining the dispersed modulated digital data, and demodulating the recombined modulated digital data to recover the digital data.

A method according to the present invention for use in a communications system for transmitting and receiving digital data at a predetermined data rate includes the steps of generating a plurality of adjacent digital channels, each channel having a waveform having a mathematical relationship to each waveform of each other channel and a phase relationship to the predetermined symbol rate, modulating the digital data by a carrier frequency, impressing the modulated digital data onto each carrier wave of each channel to form a composite signal, and transmitting the composite signal from a first station. Further, the method includes the steps of receiving the composite signal at a second station, recovering a symbol clock based on the predetermined symbol rate of the received composite signal, generating carrier waves based on the recovered data clock, the carrier waves corresponding to each channel generated by the previous generating step, each carrier wave having the mathematical relationship to each other waveform and the phase relationship previously prescribed, mixing the carrier waves based on the recovered data clock with the composite signal to recover the modulated digital data, and demodulating the digital data.

The present invention provides an alternative to conventional spread spectrum systems for dispersing energy. Additionally, the present invention can be used in conjunction with spread spectrum techniques to provide equivalent spreading factors on the order of 256 or higher. Other advantages and features of the present invention will be more fully described in connection with the description below.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION

While the following description is in the context of satellite communications systems, it will be understood by those skilled in the art that the present invention may be applied to other communications applications including ground based microwave communications and broadcast communications such as cellular radio telecommunications.

Typically, in a VSAT network, communication between a hub earth station and a remote earth station, a hub station modulates information and wirelessly transmits the information to a satellite which in turn wirelessly transmits the information for reception and demodulation by the remote station. The hub station provides digital communication for a variety of services to a series of remote stations continuously. The data stream transmitted by the hub station contain messages addressed to individual remote stations. Each remote station processes only those messages with its own address. Additionally, each remote station can be interfaced with several data terminals, with individual messages for a respective data terminal from the hub station being separated by the remote station and then passed on to the data terminal.

Figure 1:
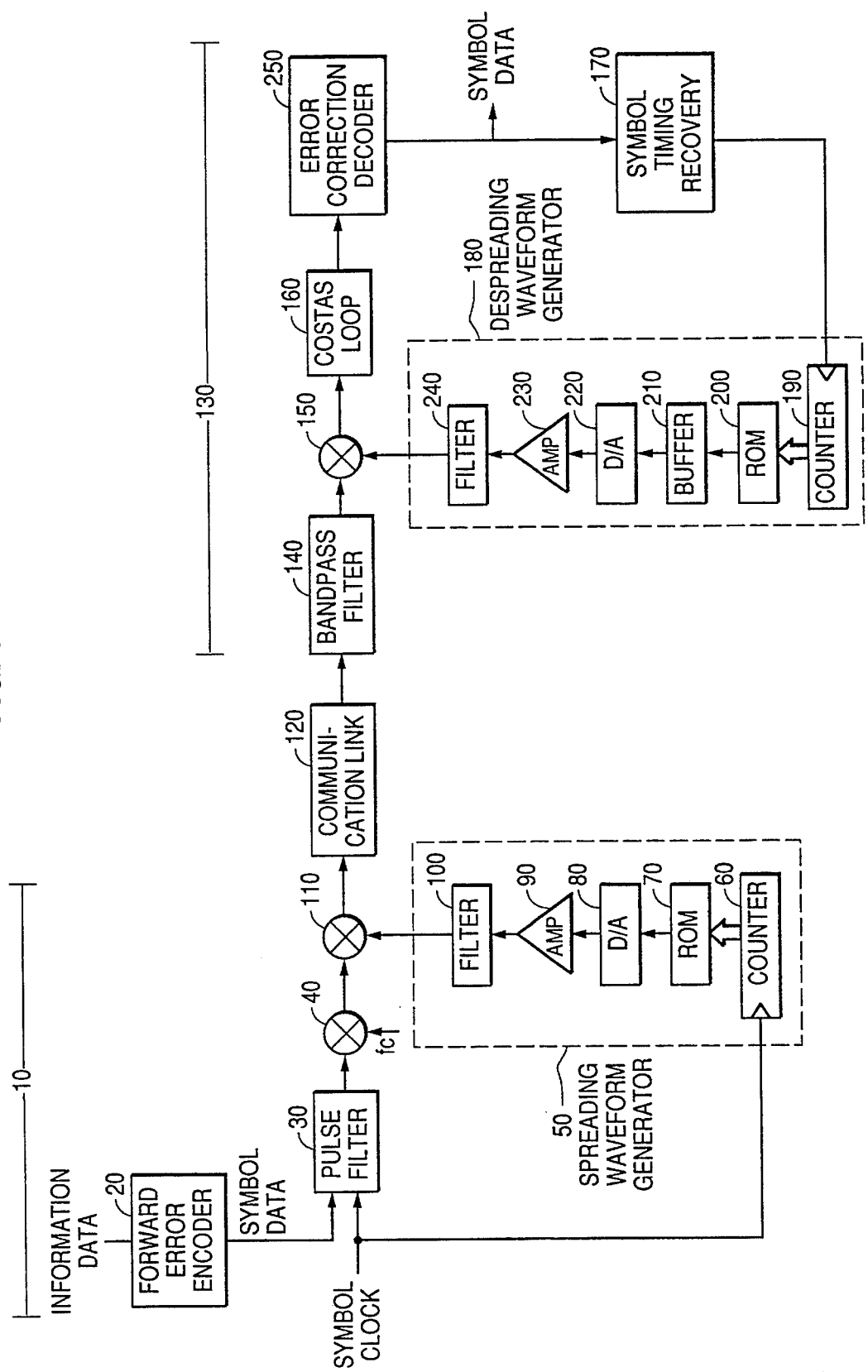
FIG. 1 is a block diagram of an embodiment of a satellite communications system according to the present invention including a hub station modulator 10, a communication link 120, and a remote terminal demodulator 130.

FIG. 1 shows an exemplary satellite communications system for performing hub station to remote station communication. The hub station modulator 10 receives information data and a data clock, for example at a rate such as 64 kbits/second. Bit errors due to transmission noise can occur, and may be greatly reduced by employing forward error correction encoding prior to transmission to the remote station. Thus, the information data may optionally be encoded with error detection and/or correction information forming the symbol data by a forward error correction edcoder 20 using any one of a variety of methods known in the art. For example, prior to transmission, data can be specially coded to add redundancy. Exemplary coding techniques include using parity bits or more elaborate forms such as a Hamming code which performs one level of error correction, by correcting a one bit error, and identifying a two bit error. Also, more complex forward error correction such as Huffman, Reed-Soloman, Viterbi, and sequential may be used, or a combination of some or all of the above.

The symbol data and symbol clock are input to a pulse filter 30. The pulse filter 30 can be replaced by any data modulator or encoder capable of producing the desired modulation data signal. The pulse filter 30 receives a rectangular data input pulse signal and filters the signal into an appropriate spectrum. Next the resulting signal is mixed with a carrier frequency by a mixer 40, typically a multiplier, modulating the data by the carrier frequency to form a modulated data signal.

A spreading waveform generator 50 also receives the symbol clock input to the pulse filter 30. The spreading waveform generator 50 may include a plurality of voltage controlled oscillators controlled by a voltage mathematically corresponding to the symbol clock (or data rate). The spreading waveform generator 50 may include a counter 60, a read only memory (ROM) 70, a digital to analog converter 80, an amplifier 90, and an active filter 100. The counter 60 receives the symbol clock and converts the symbol clock into a binary count for addressing the ROM 70, which preferably is programmable (PROM). Words stored in the ROM 70 represent stored digital waveforms. The counter 60 addresses a plurality of, for example 32 states/waveform, stored digital waveforms (i.e., frequency control words) according to the binary count. The stored digital waveforms will be more particularly described, by way of example, in connection with the forthcoming discussion of FIGS. 7a, 7b, and 7c.

By way of brief introduction, however, the stored digital waveforms comprise odd multiples of stored sinusoidal waves having a particular phase relationship (e.g., $\phi=45°$) to generate a plurality of M equivalent channels for data transmission. A composite digital waveform, including samples of the addressed digital waveforms, is sent to the digital to analog (D/A) converter 80 where the samples of the digital waveform are converted into an analog waveform signal output. An amplifier 90 amplifies the analog waveform signal and passes the signal to an active filter which removes unwanted noise. The analog waveform signal is a multichannel frequency diversity composite signal representing M channels for communication. In a preferred implementation, the analog waveform signal includes four channels (M=4).

Figure 4:
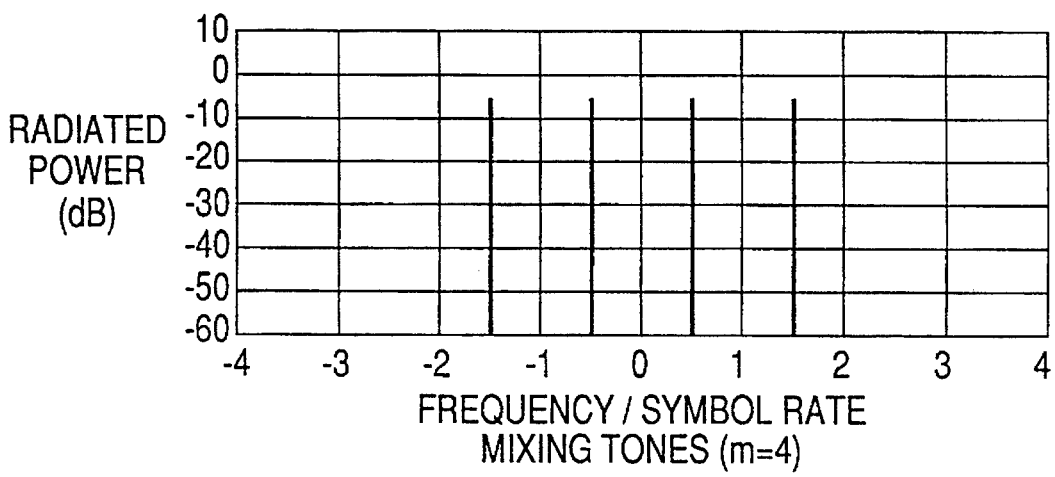
FIG. 4 shows the line spectrum for sinusoidal tones which may be used to produce the frequency diversity spectrum of FIG. 3.

In an alternative embodiment, the tones of FIG. 4 may be generated utilizing conventional voltage controlled oscillators according to the number of carrier tones to be generated. However, in some applications such an embodiment will not be as advantageous as the above described waveform generator because of the difficulty of assuring precise control of the phase. For example, it may be appropriate in a multiple carrier VCO embodiment to lock the several tones to a single tone source with precise phase adjustment control for each VCO.

The modulated data signal output of the mixer 40 is mixed with the analog waveform signal by a mixer 110, for example a multiplier, thereby spreading the modulated data signal over M channels (M≥2) in the analog waveform signal generated by the spreading waveform generator 50. Consequently, each channel contains the same modulated information. The analog waveform signal has a particular phase relationship to the symbol rate (i.e., the symbol clock may be displaced from 0° to 90° from the symbol transition) so, when mixed with the modulated data signal, a phase-aligned multichannel frequency diversity spectrum results. The spread modulated data signal is then forwarded to a communication link 120. The communication link 120 symbolically represents a number of items or products typically supplied in the art which will be described further herein.

Figure 2:
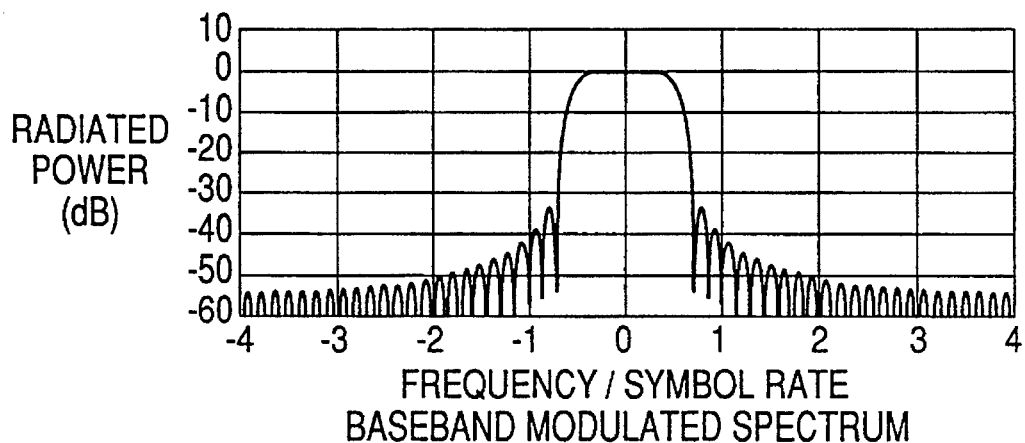
FIG. 2 shows a graphical representation of a single channel modulated spectrum according to a conventional system.
Figure 3:
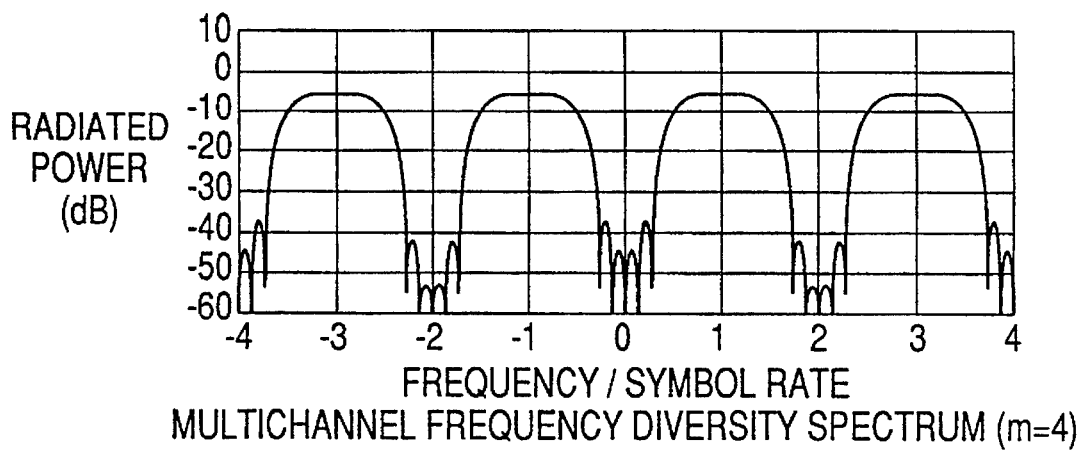
FIG. 3 shows a graphical representation of an exemplary multichannel frequency diversity spectrum according to the present invention prior to compression where the number of channels equals 4.
Figure 5:
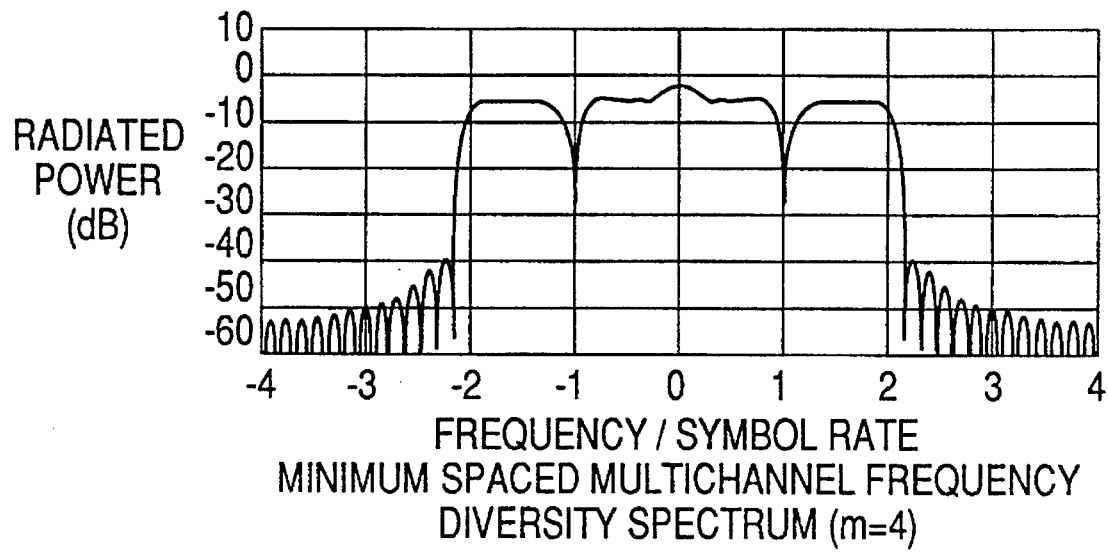
FIG. 5 shows a minimum spaced multichannel frequency diversity spectrum according to an exemplary embodiment of the present invention.

FIG. 2 represents a single channel modulated spectrum currently being used in VSAT systems. In particular, in FIG. 2 a graphical representation of the radiated power level in dB versus a frequency to symbol rate ratio is shown generically for a data signal of a given bandwidth covering between a frequency to symbol rate ratio of −1 and +1. According to the present invention, a multichannel frequency diversity spectrum shown with four channels (M=4) in FIG. 3 is produced by mixing a baseband spectrum with two sinusoidal tones which produce the line spectrum including the positive and negative mixing tones shown in FIG. 4. To conserve bandwidth, the tone frequency spacing is reduced to the 3 dB bandwidth frequency of the baseband spectrum to produce a minimum spaced multichannel frequency diversity spectrum shown in FIG. 5 where M=4.

Figure 6:
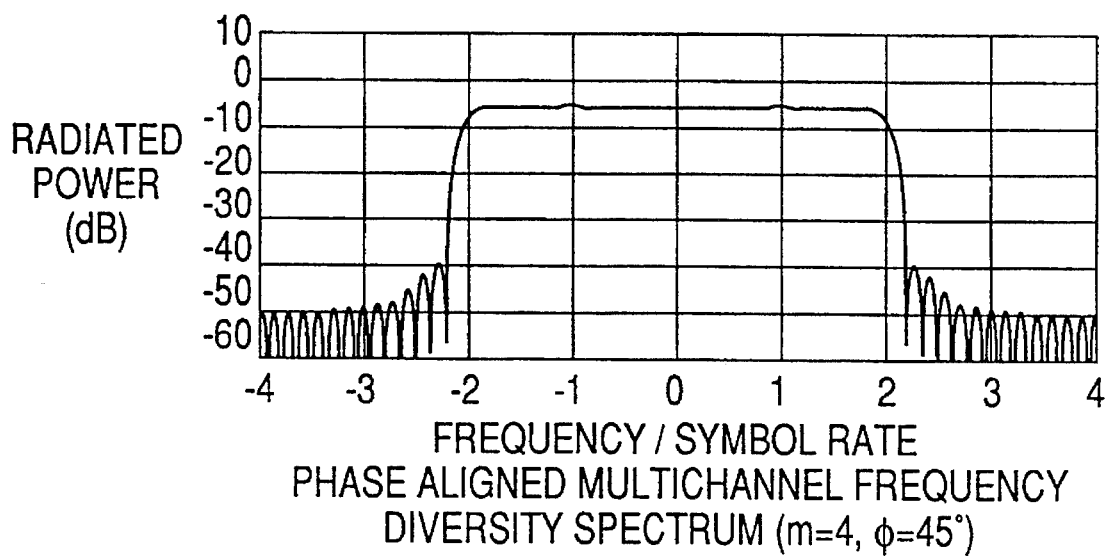
FIG. 6 shows a phase-aligned multichannel frequency diversity spectrum according to the exemplary embodiment of the present invention depicted in FIG. 5.

To achieve an optimum spectral density relative to the FCC requirements, it is desirable to have a uniform flat spectrum. By changing the phases of the mixing tones (in a preferred range of 0°≤φ≤90° depending upon M) relative to the baseband modulation, a flat spectrum as shown in FIG. 6 may be achieved. In the four channel case (M=4) with a phase relationship of approximately 45°, 6 dB (or times four) of processing gain can be achieved while only three times the bandwidth of the single channel case is required. Thus, the separation between channels is compressed together for maximum efficiency.

Efficiency results because the spectra overlap at one-half the symbol rate (or at the information data rate) which is at the optimum spacing instead of 1.2 or 1.5 times the data rate where interference between adjacent carriers can present a problem. Therefore, the carriers can be spaced optimally at the symbol rate. Thus, when the remote station transmits the spread modulated data signal to the satellite, approximately three channels of transmission bandwidth in contrast to four normal channels is required. This technique may be extended to any multiple of two channels to produce a uniform and frequency compact spectrum.

Referring again to FIG. 1, the communication link 120 may include means for upconverting the spread modulated data signal to higher bands of frequencies (i.e., C-band or Ku-band (e.g., 14 to 14.5 GHz)) for satellite communication; a hub station satellite dish with a large diameter of 6–7 meters for transmitting the upconverted spread modulated data signal; a satellite for receiving the upconverted spread modulated data signal from the hub station, converting the received spread modulated data signal to another frequency within the bandwidth (e.g., for Ku-band, typically 11.7 to 12.2 GHz), and transmitting the spread modulated data signal to a 0.95 meter or less diameter satellite dish at the remote station; and means for downconverting the spread modulated data signal from the satellite to IF (e.g., 950–1700 MHz) for demodulation at the remote station by a demodulator 130.

A bandpass filter 140 filters the received IF spread modulated data signal which downconverts the spread modulated data signal to a frequency of 44 MHz for example. Thereafter, the spread modulated data signal passes to a mixer 150 and through a Costas loop 160 to a symbol timing recovery circuit 170. The symbol timing recovery circuit 170 detects the phase and phase locks to the symbol rate. The symbol clock (rate) is twice the bit rate and can be recovered from the bit rate. The symbol timing recovery circuit 170 supplies the recovered symbol clock to the despreading waveform generator 180.

The despreading waveform generator 180 is similar to the spreading waveform generator 50 and includes a counter 190, a read only memory (ROM) 200, an intermediate buffer 210, a digital to analog converter 220, an amplifier 230, and an active filter 240. The counter 190 receives the symbol clock and converts the symbol clock into a binary count for addressing the ROM 200, which preferably is programmable (PROM). Words stored in the ROM 200 represent stored states of the digital waveforms. The counter 190 addresses the same stored words addressed by the counter 60 of the spreading waveform generator 50 according to the binary count. Thereafter, a composite digital waveform is sent to the intermediate buffer 210 which latches the information to the digital to analog (D/A) converter 220. The D/A converter 220 converts the composite digital waveform into an analog waveform signal. An amplifier 230 amplifies the analog waveform signal and passes the signal to an active filter 240 which removes unwanted noise from the analog waveform signal. The analog waveform signal contains the same number of channels as the analog waveform signal over which the symbol data was spread in the modulator 10.

Alternatively, as previously explained, a plurality of voltage controlled oscillators may be separately utilized to generate the despreading waveforms, the number of voltage controlled oscillators being dependent on M, the number of frequency diverse channels. Proper despreading is dependent on strict phase alignment of all VCO's relative to the symbol timing.

Figure 7A:
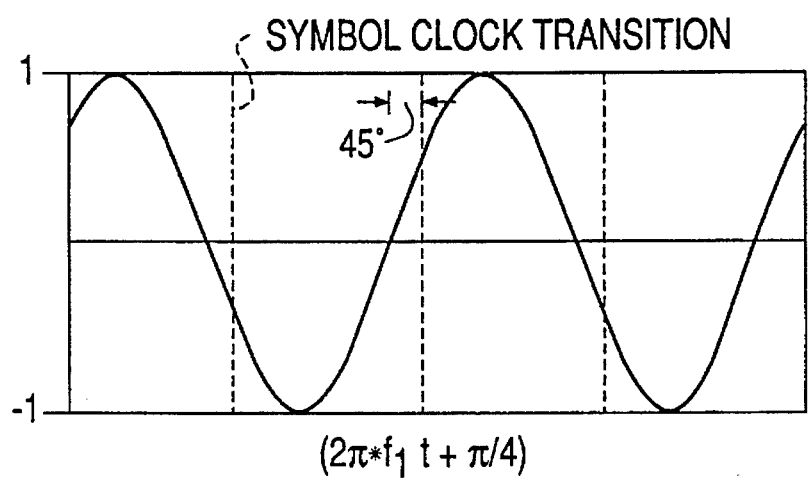
FIG. 7a represents a first sine wave which is used to generate an analog waveform signal according to an exemplary embodiment of the present invention.
Figure 7B:
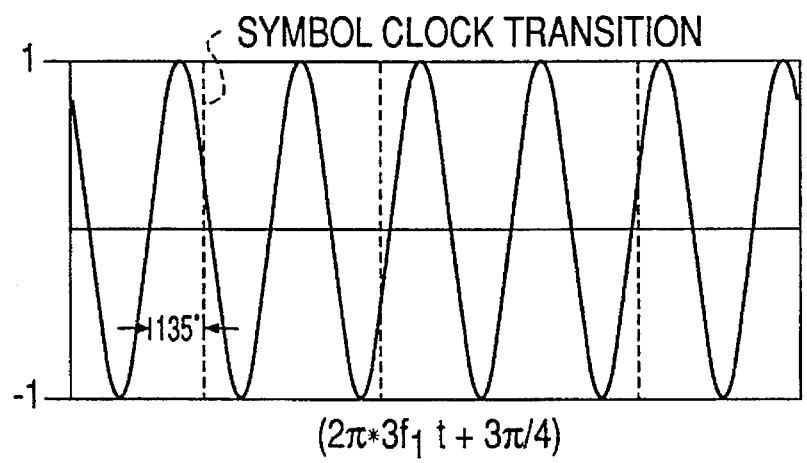
FIG. 7b represents a second sine wave which is used to generate an analog waveform signal according to an exemplary embodiment of the present invention.
Figure 7C:
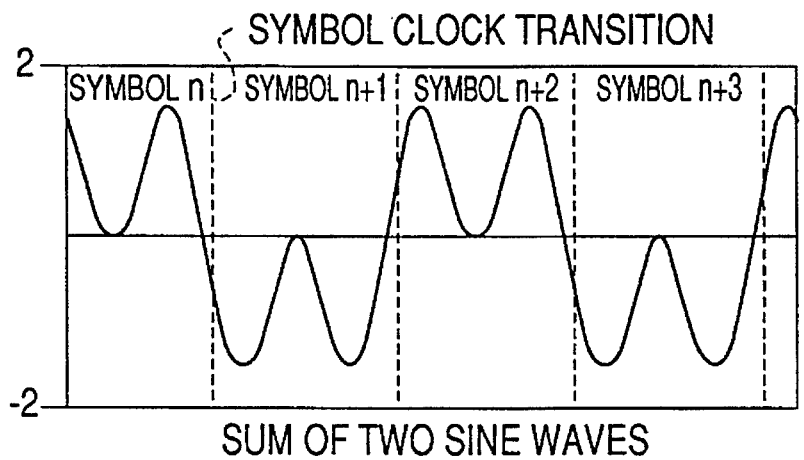
FIG. 7c represents the sum of the first and second sine waves of FIGS. 7a and 7b according to an exemplary embodiment of the present invention.

The ROM 200, preferably a PROM, is programmed to generate the number of carriers required for demodulation. When four carrier waveforms are generated, two frequencies are used, at one and three times the symbol clock. When combined with two sinusoidal tones and a phase of approximately 45°, the resulting signals are represented by $\sin(2\pi*f_1 t + \pi/4)$ and $\sin(2\pi*3f_1 t + 3\pi/4)$ as shown in FIG. 7a and FIG. 7b respectively, where $f_1$ represents one-half the symbol rate. The symbol rate in a preferred embodiment is the encoded data rate which is twice the information data rate for a rate ½ coder. The two sine wave signals are summed to form a carrier waveform having four channels with the symbol data being offset from the symbol clock by approximately 45° as shown in FIG. 7c, where symbol n represents the waveform corresponding to a first digital word, symbol n+1 represents the waveform corresponding to a second digital word, etc. A phase relationship of approximately 45° provides a flat frequency response of FIG. 6 for the phase-aligned multichannel frequency diversity spectrum when M=4. The ROM 200 outputs the digital words symbol n, symbol n+1, etc., where each represent a segment of the particular waveform at a particular point in time.

When M is greater than 4, other odd multiples of the rate 5, 7, for example, may be utilized to generate the M channels and phase relationships where a phase relationship $\phi$ in the range $0° \leq \phi \leq 90°$ can used to achieve phase alignment (for example, as per FIG. 6, for the M=4 case).

The present invention arrangement anticipates a hybrid multichannel frequency diversity/spread spectrum system. The mixer 150 mixes (e.g., multiplies) the analog waveform signal with the spread modulated data signal to despread the spread signal. Subsequently, the Costas loop 160 alemodulates the resulting modulated data signal from the mixer 150 and recovers the symbol data which may be spread via well known spread spectrum techniques. Optional error correction and/or detection can be performed on the recovered symbol data with an error correction decoder 250 in conjunction with forward error correction performed at the hub station.

Figure 8:
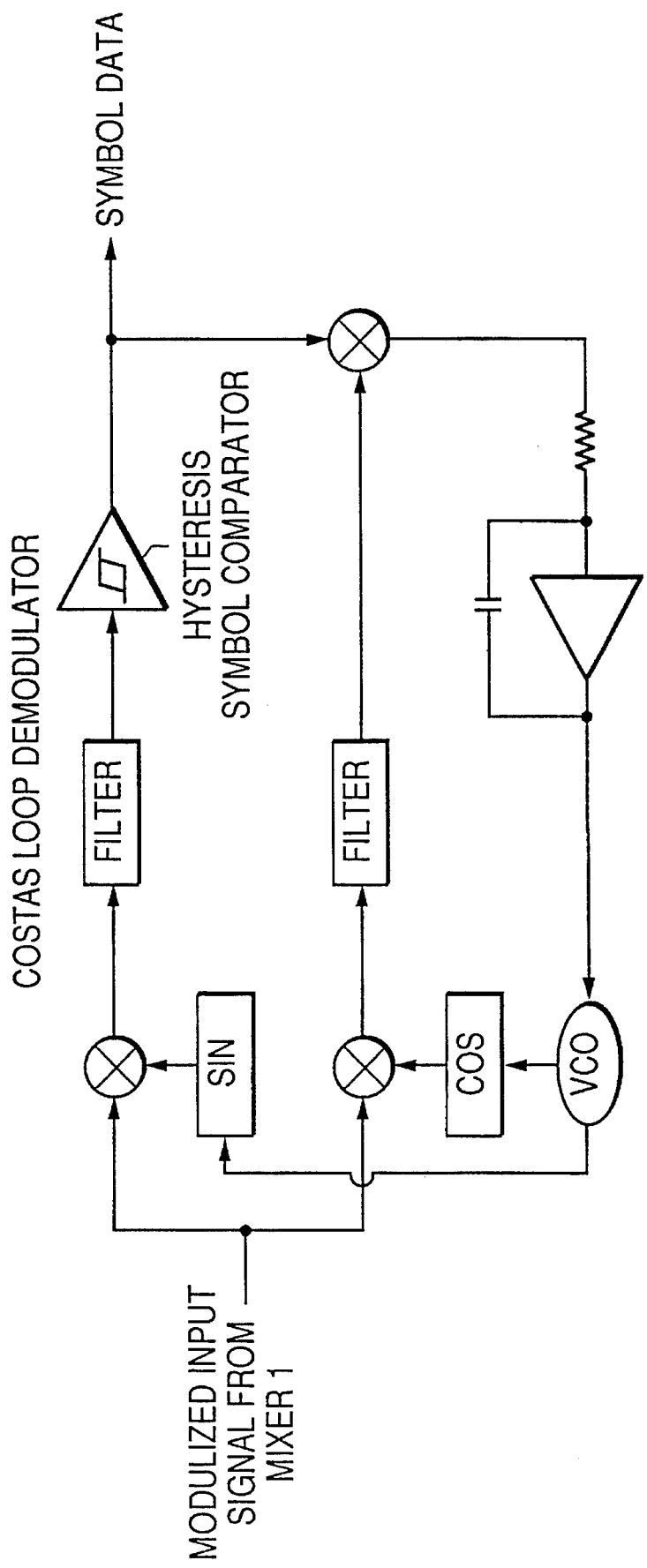
FIG. 8 shows an exemplary Costas loop demodulator according to the FIG. 1 embodiment of the present invention.

According to the FIG. 1 embodiment, demodulation may be performed by a Costas loop which is known in the art. FIG. 8 shows a block diagram of an exemplary Costas loop. The Costas loop generates a reference waveform at exactly the same frequency as the incoming modulated data signal, phase locked to the modulated data signal. When the reference signal is mixed with the modulated data and filtered to remove higher-frequency components, the resulting sign at which results is an analog replica of the original data signal. Other carrier recovery methods known to those skilled in the art can easily be adapted to the present invention. For example, U.S. Pat. No. 4,344,178 to Waters, which is herein incorporated by reference, discloses another Costas loop demodulator.

Figure 9:
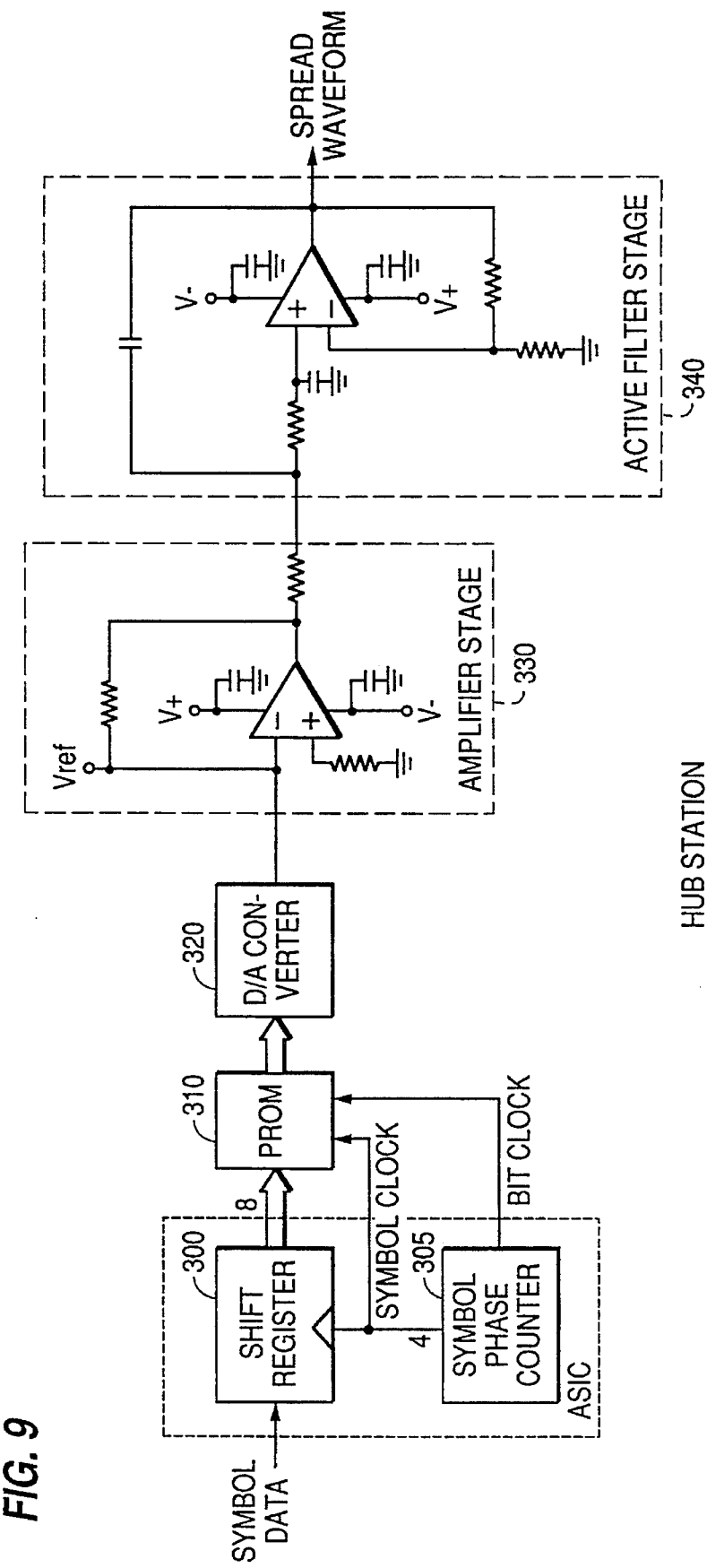
FIG. 9 shows another exemplary embodiment of a satellite communications system according to the present invention.

A specific embodiment of the present invention involves using binary phase shift keying (BPSK) modulation and demodulation, although other types of phase modulation may be employed such as QPSK (quadrature phase shift keying), MSK (minimum shift keying), FSK (frequency shift keying, M-ary PSK (M-ary phase shift keying), etc. According to this embodiment, the symbol data is spread over a selected number of channels by a carrier waveform prior to being modulated by the carrier frequency and passed to the communication link. FIG. 9 shows a block diagram of an exemplary system using BPSK.

For modulation at the hub station, symbol data is input to an ASIC (e.g., a Xilinx XC3042) including a shift register 300 and a symbol phase counter 305. The symbol phase counter 305 provides a symbol clock to the shift register 300 which receives the symbol data and generates multiple phases of the symbol clock. The shift register 300 outputs 8 bits of symbol to a PROM 310. Four symbol clock phases from the symbol phase counter in conjunction with a bit clock from the symbol phase counter 305 address the PROM 310 which contains stored words representing the composite digital waveforms. The purpose of the PROM is two-fold:

1) Eight bits of symbol are interpolated by 16 (16 phases per symbol) and shifted through a 128-stage shift register. A 112-tap FIR (finite impulse response) filter multiplies the last 112 stages of the shift register by the respective tap coefficients. The 112 products are summed and quantized to an 8-bit number representing the binary encoding scheme required by the chosen digital to analog converter. The 128-stage shift register is created hypothetically inside the PROM and is shifted 16 times per symbol. The coefficients of the 112-tap FIR are derived from any signal processing software to yield the appropriate impulse shape desired (e.g. 40% root raised cosine Nyquist).

2) The PROM also imparts the spreading waveform. Since 16 phases per symbol are input to the PROM via 4 address lines, an additional signal (e.g. the bit clock for a rate one-half encoding scheme) fully defines the 32-states needed to generate the spreading waveform. For the four tone example the PROM multiplies the FIR output by:

$$\text{Cos}(2\pi*n/32+\phi)+\text{Cos}(2\pi*3n/32+3\phi) \text{ for } n=0 \ldots 32$$

Thus, a PROM with 8-bits of shift register input and 4 bits of symbol phase timing produces the pulse-shape filtered spectra mixed with the multiple tone spreading waveform. Any PROM of size 8K×8 can be produced by a person skilled in the art. According to a preferred embodiment, and Advanced Micro Devices AM 27C512 can be employed.

The D/A converter 320 can be any converter capable of converting eight digital word inputs to the waveform output of 7a, 7b, and 7c, for example a Motorola MC 10322.

The analog waveform signal is then amplified by an amplifier stage 330 and filtered by an active filter stage 340 utilized for anti-aliasing as shown in FIG. 9. Optional forward error correction can be performed on the symbol data prior to mixing the data with the analog waveform signal.

Figure 10:
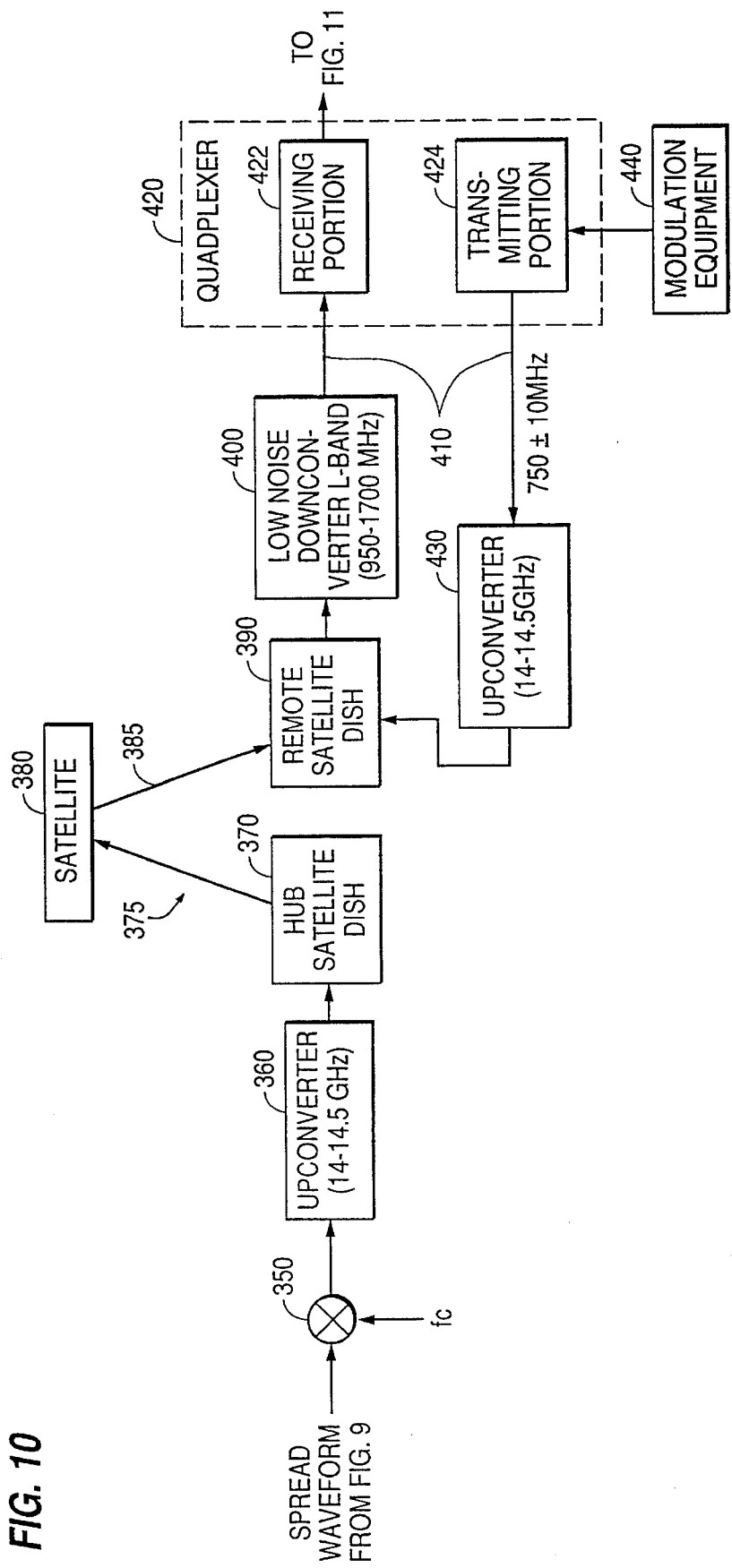
FIG. 10 is a further representation of the embodiment of FIG. 9.

Thereafter, as shown in FIG. 10 the resulting carrier wave is modulated by the carrier frequency $f_c$ at a mixer 350. A communication link includes an upconverter 360, a hub satellite dish 370, a satellite 380, wireless links 375 and 385, a remote satellite dish 390, a low noise downconverter 400, and an upconverter 410. The communication link performs the appropriate upconverting and downconverting for hub station to satellite and satellite to remote station communication. Specifically, the upconverter 360 upconverts the spread modulated data signal to Ku-band with a frequency of 14–14.5 GHz. A hub station satellite dish 370 with a diameter of approximately 6–7 meters transmits the upconverted spread modulated data signal to the satellite 380. The satellite 380 receives the upconverted spread modulated data signal, converts the spread modulated data signal to another Ku-band frequency from 11.7–12.2 GHz, and transmits the spread modulated data signal to a remote station satellite dish 390 of less than one meter, for example. The spread modulated data signal is downconverted to an IF of 950–1700 MHz by a downconverter 400.

Figure 11:
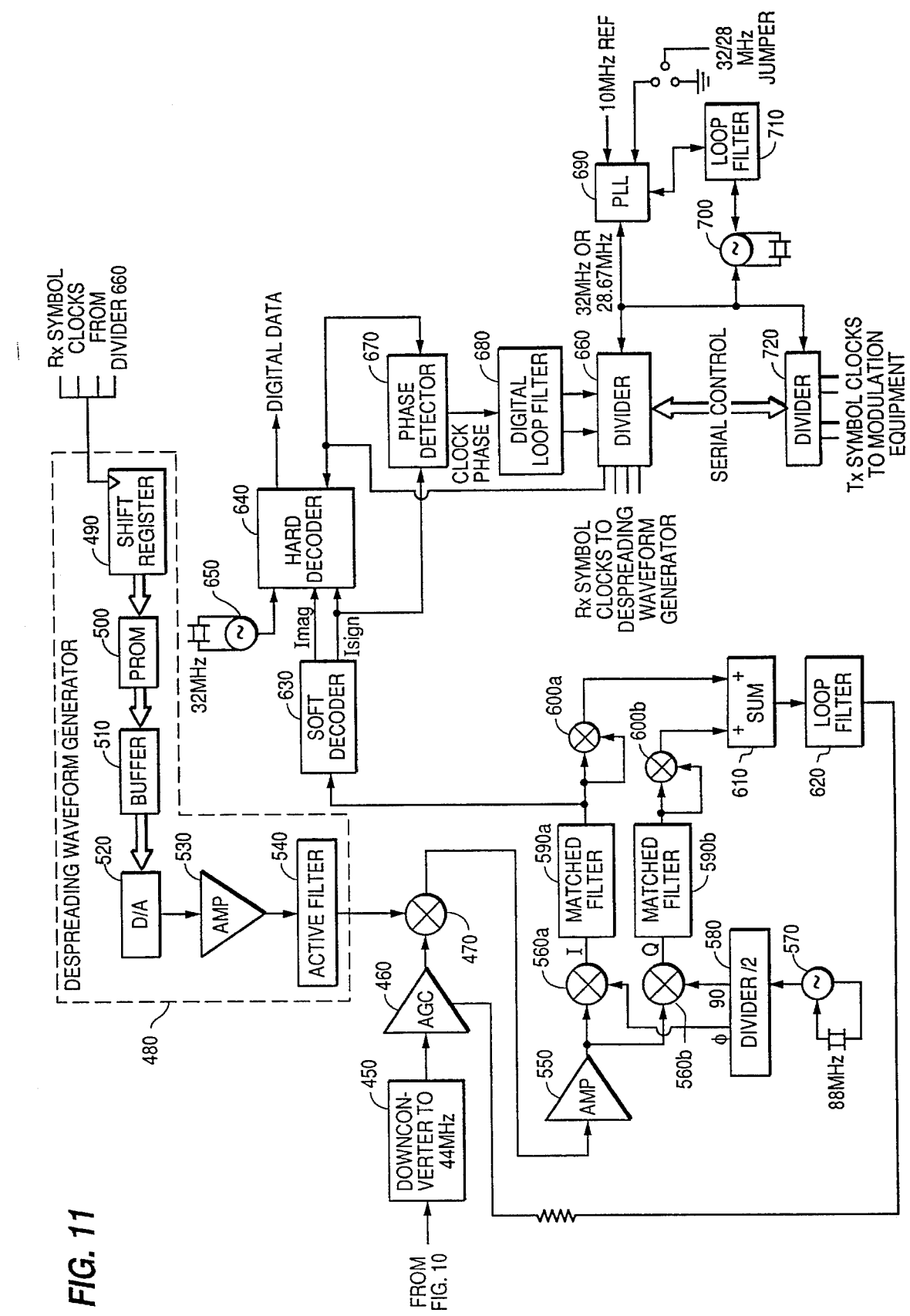
FIG. 11 is a further representation of the embodiment of FIGS. 9 and 10.

An interfacility link (IFL) connects the downconverter 400 with a quadplexer 420. Typically, the IFL is a cable (e.g., a 50 Ohm coax with low-loss foam insulation, in the general class of RG-58U or RG-8U depending upon the required length) for connecting outdoor radio equipment including the remote station satellite dish 390, the low noise downconverter 400, and the upconverter 430 with indoor radio equipment including the receiving portion 422 of the quadplexer 420, the transmitting portion 424 of the quadplexer 420, and further modulation equipment 440 and demodulation equipment (shown in FIG. 11 ) for transmission and reception respectively. The remote station, in addition to receiving transmissions from the hub station via the communication link, can also through the modulation equipment 440 and the transmitting portion 424 of the quadplexer 420, transmit data messages via the satellite to the hub station.

The quadplexer 420 uses frequency bandpass filters (not shown) to separate transmit, receive, reference, and control signals and DC power. The receiving portion sends the spread modulated data signal downconverted to an IF frequency range of 950–1700 MHz to another downconverter 450 for further downconversion to a final IF of 44 MHz for demodulation. IF frequencies other than 44 MHz may be used as well. The downconverter 450 typically includes a series of filters and phase locked loops to downconvert the spread modulated data signal to 44 MHz. An amplifier 460 performs automatic gain control on the 44 MHz spread modulated data signal. Next, the spread modulated data signal is mixed with an analog waveform generated by a despreading waveform generator 480 at a mixer 470.

The despreading waveform generator 480 includes a PROM 500 which receives the recovered symbol clocks, a buffer 510, a D/A converter 520, an amplifier stage 530, and an active filter stage 540. In a preferred embodiment, the PROM 500 may be an Advanced Micro Devices 27C256. A more detailed representation of the despreading waveform generator 480 is shown in FIG. 12.

Figure 12:
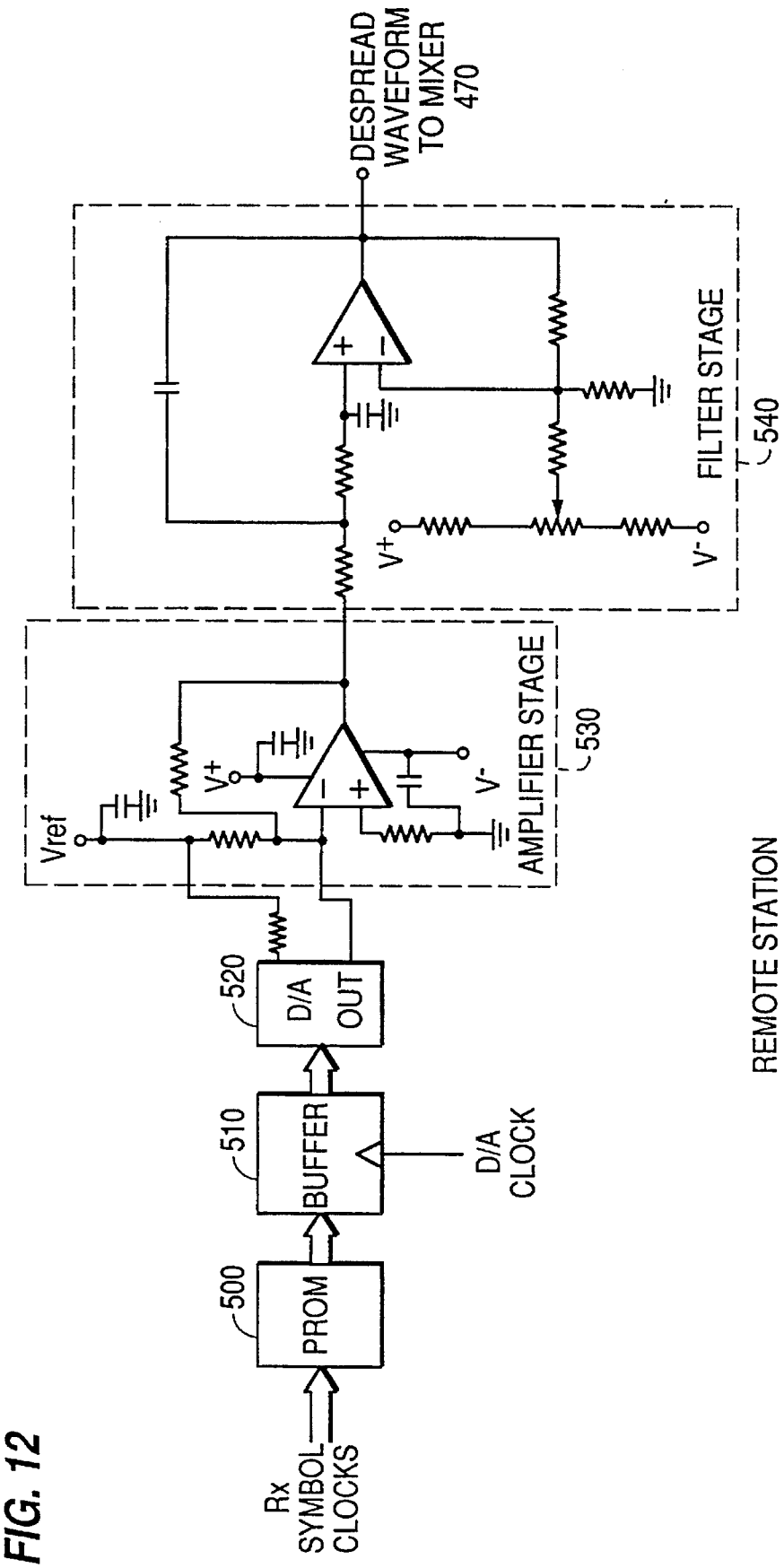
FIG. 12 is a more detailed representation of the despreading waveform generator shown in FIG. 11.

Referring to FIG. 12, the recovered symbol clocks from the symbol recovery circuit (to be described later) address the PROM 500. The PROM 500 contains stored words representing states of the digital waveform. An intermediate storage buffer 510 receives samples of a composite digital waveform based on the stored waveforms addressed in the PROM 500. In accordance with a clock signal associated with the D/A converter 520, samples of the composite digital waveform are latched to the D/A converter 520 which converts the samples of the composite digital waveform into an analog waveform signal. The amplifier stage 530 and the active filter stage 540 respectively amplify and filter the despreading analog waveform to the appropriate frequency level which is the same as the frequency level of the analog waveform signal generated by the spreading analog waveform signal.

The despreading analog waveform signal is mixed with the spread modulated data signal received from the automatic gain control amplifier 460 by the mixer 470 to despread the spread modulated data signal. The resulting modulated data signal appears as one signal as shown for example in the phased aligned multichannel frequency diversity spectrum represented in FIG. 6. The modulated data signal is amplified by an amplifier 550 and fed to a Costas loop for further demodulation. Specifically, a pair of mixers 560a and 560b divides the amplified signal into I and Q channel signals. An 88 MHz crystal provides a VCO 570 with an oscillating frequency of 88 MHz which passes to a frequency divider 580 to lock the modulated data signal to 44 MHz. The frequency divider 580 divides the 88 MHz frequency signal by two and provides the respective mixers 560a and 560b with 44 MHz frequency signals separated by a phase of 90°. Thus, a frequency signal of exactly the same frequency as the incoming modulated data signal, phase locked to the modulated data signal is mixed with the modulated data signal at the mixers 560a and 560b. Next, the I and Q channel signals from mixers 560a and 560b are respectively filtered by matched filters 590a and 590b to remove high frequency components and produce the original components of the original modulation.

The output of the filters 590a and 590b is squared by mixers 600a and 600b respectively. The squared signals are combined by a summer 610 and subsequently filtered by a loop filter 620 and input to the automatic gain control circuit 460 via a resistor.

A soft decoder 630 receives the filtered I channel signal from the matched filter 590a and roughly estimates the I channel signal. The output of the soft decoder 630 includes a magnitude, $I_{mag}$, and sign, $I_{sign}$, estimate of the I channel signal. A hard decoder 640 receives $I_{mag}$, $I_{sign}$, a reference frequency signal of 32 MHz provided by a VCO 650 controlled by a 32 MHz crystal, and a receiver symbol clock from a divider 660 (operation to be explained later). The hard decoder 640 performs digital "hard decisions" on the $I_{mag}$ and $I_{sign}$ representation of the original modulated data signal to recover a true digital waveform. To reduce noise effects, the recovered receiver symbol clock reclocks the hard decision demodulated data near the center of each bit, where the bit amplitude prior to each hard decisions is greatest and noise effects are minimized.

A timing recovery circuit receives the $I_{sign}$ signal and through various circuitry recovers the receiver symbol clocks which are forwarded to the despreading waveform generator 480 utilized in generation of the despreading waveform. In particular, independent of whether the long Costas loop has locked up, a phase detector 670 receives the $I_{sign}$ signal from the soft decoder 630 and the receiver symbol clock from the divider 660 and detects the clock phase of the original modulated data signal. A digital loop filter 680 filters the clock phase and inputs the phase to the divider 660. The divider 660 also receives a frequency signal of 32 MHz or 28.672 MHz from a phase-locked loop 690 which runs locked to a 10 MHz reference frequency. Also, the N portion of the divisor of N+1 or N−1 is provided to the divider 660 according to the information signal bit rate. For example, for 56 KBPS, N=256; for 64 KBPS, N=224: for 128 KBPS, N=112; and for 256 KBPS, N=56.

A 32/28 Mhz jumper provides an input frequency to the phase-locked loop. A VCO 700 also receives the phase-locked loop frequency signal and oscillates at a selected frequency according to the phase-locked loop 690. The VCO frequency signal is filtered by a loop filter 710 and sent to the phase-locked loop 690.

The divider 720 determines the transmitter symbol clocks for modulator encoding which is sent to the modulation equipment for the transmission of information by the remote station to the hub station. The divider 720 also receives a frequency signal from the phase-locked loop 690 and the divisor N from serial control (as described above).

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What we claim is:

1. An apparatus for dispersing energy over a wide bandwidth when communicating digital data having a predetermined data rate comprising:

means for modulating the digital data by a predetermined carrier frequency;

means for generating a plurality of M adjacent channels, M being an integer multiple of two less than or equal to sixteen, wherein each channel has a sinusoidal waveform in a mathematical relationship to each sinusoidal waveform of each other channel and each channel has a predetermined phase relationship to the digital data having the predetermined data rate; and means for dispersing the modulated digital data on the M channels, wherein each channel contains the same modulated digital data.

2. The apparatus of claim 1 wherein M equals four.

3. The apparatus of claim 2 wherein said generating means includes means for compressing a spectral bandwidth of the four adjacent digital channels to be approximately equal to a spectral bandwidth of three adjacent digital channels.

4. The apparatus of claim 1 wherein the mathematical relationship between each sinusoidal waveform is a function of the predetermined data rate.

5. A communications system for transmitting and receiving digital data at a predetermined data rate comprising:

first channel generating means for generating a plurality of adjacent digital channels, each channel having a sinusoidal waveform in a mathematical relationship to each sinusoidal waveform of each other channel and a phase relationship to the predetermined data rate;

means for modulating the digital data by a carrier frequency;

means responsive to said first generating means and said modulating means for forming a composite signal by impressing the modulated digital data onto each channel;

means for transmitting the composite signal;

means for receiving the composite signal;

clock recovery means for recovering a data clock based on the predetermined data rate of the received composite signal;

second channel generating means, responsive to the data clock, for generating each channel generated by said first channel generating means, each channel having a sinusoidal waveform in the mathematical relationship to each sinusoidal waveform of each other channel and the phase relationship to the predetermined data rate prescribed by said first channel generating means;

means, responsive to said second channel generating means, for coherently combining channels generated by said second channel generating means with the composite signal to recover the modulated digital data; and demodulating means for demodulating the digital data.

6. The communications system of claim 5 further comprising a satellite communication link for coupling said transmitting means and said receiving means.

7. The communications system of claim 5 wherein said first channel generating means includes a programmable read only memory which receives phases of a clock signal based on the predetermined data rate and generates digital word samples of digital waveforms.

8. The communications system of claim 7 wherein said first channel generating means further includes a digital to analog converter responsive to said programmable read only memory for converting the digital word samples to at least one analog waveform signal.

9. The communications system of claim 8 wherein the mathematical relationship between each sinusoidal waveform includes an odd integer multiplication factor.

10. The communications system of claim 9 wherein a first sinusoidal waveform is represented by $\sin(2\pi*f_1 t+\phi)$ and a second sinusoidal waveform is represented by $\sin(2\pi*3f_1 t+3\phi)$ wherein $f_1$ is a function of the predetermined symbol rate.

11. The communications system of claim 10 wherein the mathematical relationship further includes a sum of the first sinusoidal waveform and the second sinusoidal waveform.

12. The communications system of claim 5 wherein said second channel generating means includes a programmable read only memory which receives phases of the data clock and generates digital word samples of digital waveforms.

13. The communications system of claim 12 wherein said second channel generating means further includes a digital to analog converter responsive to said programmable read only memory for converting the digital word samples to at least one analog waveform signal.

14. The communications system of claim 5 wherein the phase relationship is within a range from 0° to 90°.

15. The communications system of claim 5 further including:

means for encoding the digital data with forward error correction information; and error decoding means for detecting and correcting errors in the demodulated digital data based on the forward error correction information.

16. The communications system of claim 5 wherein said first channel generating means generates four adjacent digital channels.

17. The communications system of claim 16 wherein said first channel generating means compresses a spectral bandwidth of the four adjacent digital channels to be approximately equal to a spectral bandwidth of three adjacent digital channels.

18. The communications system of claim 17 wherein the phase relationship is approximately 45°.

19. The communications system of claim 5 wherein said first channel generating means compress a spectral bandwidth of the adjacent digital channels by approximately 25%.

20. In a system for receiving a modulated data signal transmitted at a predetermined data rate via a communication link, a receiving apparatus comprising:

clock recovery means for recovering a data clock based on the predetermined data rate from the modulated data signal;

periodic waveform generating means, responsive to the data clock, for generating a plurality of adjacent digital channels, each channel having a sinusoidal waveform having a first mathematical relationship to each sinusoidal waveform of each other channel and a phase relationship to the predetermined data rate;

means, responsive to said waveform generating means, for recovering digital data from the modulated data signal based on each sinusoidal waveform of each channel; and demodulating means for demodulating the digital data.

21. The receiving apparatus of claim 20 wherein the communication link includes a satellite link for coupling a transmitter and said receiving apparatus.

22. The receiving apparatus of claim 20 wherein said waveform generating means includes a programmable read only memory which receives phases of the data clock and generates digital word samples of digital waveforms.

23. The receiving apparatus of claim 22 wherein said waveform generating means further includes a digital to analog converter responsive to said programmable read only memory for converting the digital word samples to at least one analog waveform signal.

24. The receiving apparatus of claim 23 wherein the mathematical relationship between each sinusoidal waveform includes an odd integer multiplication factor.

25. The receiving apparatus of claim 24 wherein a first sinusoidal waveform is represented by $\sin(2\pi*f_1 t+\phi)$ and a second sinusoidal waveform is represented by $\sin(2\pi*3f_1 t+3\phi)$ wherein $f_1$ is a function of the symbol clock and $\phi$ is a function of the phase relationship.

26. The receiving apparatus of claim 25 wherein the mathematical relationship further includes a sum of the first sinusoidal waveform and the second sinusoidal waveform.

27. The receiving apparatus of claim 20 wherein the phase relationship is within a range from 0° to 90°.

28. The receiving apparatus of claim 20 wherein said waveform generating means generates four adjacent digital channels.

29. The receiving apparatus of claim 28 wherein said waveform generating means compresses a spectral bandwidth of the four adjacent digital channels to be approximately equal to a spectral bandwidth of three adjacent digital channels.

30. The receiving apparatus of claim 29 wherein the phase relationship is approximately 45°.

31. The receiving apparatus of claim 20 wherein said waveform generating means compresses a spectral bandwidth of the adjacent digital channels by approximately 25%.

32. In a system for transmitting digital data having a predetermined data rate via a communication link to a receiver, a transmitting apparatus comprising:

periodic waveform generating means for generating a plurality of adjacent digital channels, each channel having a sinusoidal waveform having a mathematical relationship to each sinusoidal waveform of each other channel and a phase relationship to the predetermined data rate;

means for modulating the digital data by a carrier frequency; and means responsive to said waveform generating means and said modulating means for forming a composite signal by impressing the modulated digital data onto each channel.

33. The transmitting apparatus of claim 32 further comprising a satellite communications link for coupling said transmitting apparatus and said receiver.

34. The transmitting apparatus of claim 32 wherein said waveform generating means includes a programmable read only memory which receives phases of a clock signal based on the predetermined data rate and generates digital word samples of a digital waveform.

35. The transmitting apparatus of claim 34 wherein said waveform generating means further includes a digital to analog converter responsive to said programmable read only memory for converting the digital word samples to at least one analog waveform signal.

36. The transmitting apparatus of claim 35 wherein the mathematical relationship between each sinusoidal waveform includes an odd integer multiplication factor.

37. The transmitting apparatus of claim 36 wherein a first sinusoidal waveform is represented by $\sin(2\pi*f_1 t+\phi)$ and a second sinusoidal waveform is represented by $\sin(2\pi*3f_1 t+3\phi)$ wherein $f_1$ is a function of the predetermined symbol rate and $\phi$ is a function of the phase relationship.

38. The transmitting apparatus of claim 37 wherein the mathematical relationship further includes a sum of the first sinusoidal waveform and the second sinusoidal waveform.

39. The transmitting apparatus of claim 32 wherein the phase relationship is within a range from 0° to 90°.

40. The transmitting apparatus of claim 32 wherein said waveform generating means generates four adjacent digital channels.

41. The transmitting apparatus of claim 40 wherein said waveform generating means compresses a spectral bandwidth of the four adjacent digital channels to be approximately equal to a spectral bandwidth of three adjacent digital channels.

42. The transmitting apparatus of claim 32 wherein said waveform generating means compresses a spectral bandwidth of the adjacent digital channels by approximately 25%.

43. A method of dispersing energy over a wide bandwidth when communicating digital data having a predetermined data rate, said method comprising the steps of:

modulating the digital data by a predetermined carrier frequency;

generating a plurality of M adjacent channels, M being an integer multiple of two less than or equal to sixteen, wherein each channel has a sinusoidal waveform mathematically related to each sinusoidal waveform of each other channel and each channel has a predetermined phase relationship to the digital data having the predetermined data rate; and dispersing the modulated digital data on the M channels, wherein each channel contains the same modulated digital data.

44. The method of claim 43 wherein M equals four.

45. The method of claim 44 wherein said step of generating further includes compressing a spectral bandwidth of the four adjacent digital channels to be approximately equal to a spectral bandwidth of three adjacent digital channels.

46. In a communications system for transmitting and receiving digital data at a predetermined data rate a method comprising the steps of:

a) generating a plurality of adjacent digital channels, each channel having a sinusoidal waveform having a mathematical relationship to each sinusoidal waveform of each other channel and a phase relationship to the predetermined data rate;

b) modulating the digital data by a carrier frequency;

c) impressing the modulated digital data onto each channel to form a composite signal;

d) transmitting the composite signal from a first station;

e) receiving the composite signal at a second station;

f) recovering a data clock based on the predetermined data rate of the received composite signal;

g) generating sinusoidal waveforms based on the recovered data clock, the sinusoidal waveforms corresponding to each channel generated at said step a), each sinusoidal waveform having the mathematical relationship to each other sinusoidal waveform and the phase relationship prescribed at said step a);

h) recovering the modulated digital data from the composite signal based on the sinusoidal waveforms generated at said step g); and i) demodulating the digital data.

47. The method of claim 46 further including the step of coupling the first station and the second station via a satellite communication link.

48. The method of claim 46 wherein said step a) includes the steps of:
  receiving phases of a clock signal based on the predetermined data rate;
  generating digital word samples of a digital waveform; and
  converting the digital word samples to at least one analog waveform signal.

49. The method of claim 46 wherein said step g) includes the steps of:
  receiving phases of the data clock;
  generating digital word samples of a digital waveform; and
  converting the digital word samples to at least one analog waveform signal.

50. The method of claim 49 wherein the mathematical relationship between each sinusoidal waveform includes an odd integer multiplication factor.

51. The method of claim 50 wherein a first sinusoidal waveform is represented by $\sin(2\pi*f_1 t+\phi)$ and a second sinusoidal waveform is represented by $\sin(2\pi*3f_1 t+3\phi)$ wherein $f_1$ is a function of the predetermined data rate and $\phi$ is a function of the phase relationship.

52. The method of claim 51 wherein the mathematical relationship further includes a sum of the first sinusoidal waveform and the second sinusoidal waveform.

53. The method of claim 46 wherein the phase relationship is within a range from 0° to 90°.

54. The method of claim 46 further including the steps of:
  encoding the digital data with forward error correction information before said step d) ; and
  detecting and correcting errors in the demodulated digital data based on the forward error correction information.

55. The method of claim 46 wherein said step a) includes the step of generating four adjacent digital channels.

56. The method of claim 55 wherein said step a) further includes the step of compressing a spectral bandwidth of the four adjacent digital channels to be approximately equal to a spectral bandwidth of three adjacent digital channels.

57. The method of claim 56 wherein the phase relationship is approximately 45°.

58. The method of claim 46 wherein said step a) includes the step of compressing a spectral bandwidth of the adjacent digital channels by approximately 25%.

59. A method of receiving a modulated data signal transmitted at a predetermined data rate via a communication link, comprising the steps of:
  recovering a data clock from the modulated data signal based on the predetermined data rate;
  in response to the data clock, generating sinusoidal waveforms, each sinusoidal waveform corresponding to at least one of a plurality of adjacent digital channels, each sinusoidal waveform having a mathematical relationship to each other sinusoidal waveform and a phase relationship to the predetermined data rate;
  recovering modulated digital data from the modulated data signal based on the generated sinusoidal waveforms; and
  demodulating the digital data.

60. The method of claim 59 wherein said step of generating includes the steps of receiving phases of the data clock;
  generating digital word samples of a digital waveform; and
  converting the digital word samples to at least one analog waveform signal.

61. The method of claim 60 wherein the mathematical relationship between each sinusoidal waveform includes an odd integer multiplication factor.

62. The method of claim 61 wherein said step of generating includes generating a first sinusoidal waveform represented by $\sin(2\pi*f_1 t+\phi)$ and a second sinusoidal waveform represented by $\sin(2\pi*3f_1 t+3\phi)$, wherein $f_1$ is a function of the symbol clock and $\phi$ is a function of the phase relationship.

63. The method of claim 62 wherein the mathematical relationship further includes a sum of the first sinusoidal waveform and the second sinusoidal waveform.

64. The method of claim 59 wherein the phase relationship is within a range from 0° to 90°.

65. The method of claim 59 wherein said step of generating includes generating four adjacent digital channels.

66. The method of claim 65 wherein said step of generating further includes compressing a spectral bandwidth of the four adjacent digital channels to be approximately equal to a spectral bandwidth of three adjacent digital channels.

67. The method of claim 66 wherein the phase relationship is approximately 45°.

68. The method of claim 59 wherein said step of generating includes compressing a spectral bandwidth of the adjacent digital channels by approximately 25%.

69. A method of transmitting digital data having a predetermined data rate via a communication link to a receiver comprising the steps of:
  generating a plurality of adjacent digital channels, each channel having a sinusoidal waveform having a mathematical relationship to each sinusoidal waveform of each other channel and a phase relationship to the predetermined data rate;
  modulating the digital data by a carrier frequency; and
  impressing the modulated digital data onto each channel to form a composite signal.

70. The method of claim 69 wherein said step of generating includes the steps of:
  receiving phases of a clock signal based on the predetermined data rate;
  generating digital word samples of a digital waveform; and
  converting the digital word samples to at least one analog waveform signal.

71. The method of claim 70 wherein the mathematical relationship between each sinusoidal waveform includes an odd integer multiplication factor.

72. The method of claim 71 wherein said step of generating includes the step of generating a first sinusoidal waveform represented by $\sin(2\pi*f_1 t+\phi)$ and a second sinusoidal waveform represented by $\sin(2\pi*3f_1 t+3\phi)$, wherein $f_1$ is a function of the predetermined data rate and $\phi$ is a function of the phase relationship.

73. The method of claim 72 wherein the mathematical relationship further includes a sum of the first sinusoidal waveform and the second sinusoidal waveform.

74. The method of claim 69 wherein the phase relationship is within a range from 0° to 90°.

75. The method of claim 69 wherein said step of generating includes the step of generating four adjacent digital channels.

76. The method of claim 75 wherein said step of generating further includes compressing a spectral bandwidth of the four adjacent digital channels to be approximately equal to a spectral bandwidth of three adjacent digital channels.

77. The method of claim 76 wherein said step of generating includes compressing a spectral bandwidth of the adjacent digital channels by approximately 25%.

* * * * *